(12) United States Patent
Scott, IV

(10) Patent No.: US 9,982,447 B2
(45) Date of Patent: May 29, 2018

(54) MOBILE SAFETY PLATFORM WITH INTEGRAL TRANSPORT

(71) Applicant: RED DOG MOBILE SHELTERS, LLC, Amarillo, TX (US)

(72) Inventor: Oscar T. Scott, IV, Amarillo, TX (US)

(73) Assignee: RED DOG MOBILE SHELTERS, LLC, Amarillo, TX (US)

( * ) Notice: Subject to any disclaimer, the term of this patent is extended or adjusted under 35 U.S.C. 154(b) by 33 days.

(21) Appl. No.: 15/095,991

(22) Filed: Apr. 11, 2016

(65) Prior Publication Data

US 2016/0297271 A1 Oct. 13, 2016

Related U.S. Application Data

(60) Provisional application No. 62/145,235, filed on Apr. 9, 2015, provisional application No. 62/280,039, filed on Jan. 18, 2016.

(51) Int. Cl.
*B60G 17/017* (2006.01)
*E04H 1/12* (2006.01)
(Continued)

(52) U.S. Cl.
CPC ............ *E04H 1/12* (2013.01); *B60G 17/017* (2013.01); *B62D 39/00* (2013.01); *E04H 9/14* (2013.01);
(Continued)

(58) Field of Classification Search
CPC .. E04H 1/12; B60G 17/017; B60G 2202/413; B60G 2400/252; B60S 9/12
(Continued)

(56) References Cited

U.S. PATENT DOCUMENTS 1,122,375 A   12/1914 Engle
1,122,431 A   12/1914 Sexton
(Continued)

FOREIGN PATENT DOCUMENTS

JP   03241129 A   10/1991
WO   9317208 A1   9/1993

OTHER PUBLICATIONS

Oscar T. Scott IV, U.S. Appl. No. 12/579,004, Non-Final Office Action dated Feb. 1, 2011.
(Continued)

*Primary Examiner* — Faye M Fleming
(74) *Attorney, Agent, or Firm* — Russell Ng PLLC; Brian F. Russell

(57) ABSTRACT

In some embodiments, a mobile safety platform includes a protective enclosure coupled to a frame of a wheeled transport. The wheeled transport is configured to raise the protective enclosure so that the wheeled transport can relocate the protective enclosure and to lower the protective enclosure so that the protective enclosure and/or deck is deployed on a substrate. In at least one embodiment, the wheeled transport is configured to raise and to lower the protective enclosure utilizing a lifting and lowering mechanism, such as a hydraulic system. In at least one embodiment, the lifting and lowering mechanism is configured, when deployed, to transfer at least some of the weight of the transport to the protective enclosure and/or deck. In at least one embodiment, the wheeled transport comprises a trailer. In other embodiments, the wheeled transport can be a motor vehicle including an engine.

19 Claims, 15 Drawing Sheets

(51) Int. Cl.
*B62D 39/00* (2006.01)
*E04H 9/14* (2006.01)
*E04H 15/62* (2006.01)

(52) U.S. Cl.
CPC ....... *E04H 15/62* (2013.01); *B60G 2202/413* (2013.01); *B60G 2300/04* (2013.01); *B60G 2300/38* (2013.01); *B60G 2500/30* (2013.01); *B60G 2800/204* (2013.01)

(58) Field of Classification Search
USPC .......................................... 280/6.153, 6.155
See application file for complete search history.

(56) References Cited

U.S. PATENT DOCUMENTS

| | | |
|---|---|---|
| 1,689,426 A | 10/1928 | Knapen |
| D136,060 S | 7/1943 | Crowe |
| 2,363,917 A | 11/1944 | Waterman et al. |
| 2,427,937 A | 9/1947 | Willson |
| D152,968 S | 3/1949 | Hewlett |
| 2,765,499 A | 10/1956 | Couse |
| RE24,895 E | 11/1960 | Clements |
| 2,976,875 A | 3/1961 | Hoffman |
| 3,130,688 A * | 4/1964 | Gutridge .................. B60F 1/00 105/198.1 |
| 3,170,472 A | 2/1965 | Cushman |
| 3,302,552 A | 2/1967 | Walsh |
| 3,335,529 A | 8/1967 | Gedney |
| 3,342,444 A | 9/1967 | Nelson |
| 3,429,767 A | 2/1969 | Pincus |
| 3,509,811 A | 5/1970 | Topp |
| D221,140 S | 7/1971 | Wood |
| 3,601,934 A | 8/1971 | Dietz |
| 3,685,426 A | 8/1972 | Rosa |
| 3,726,054 A | 4/1973 | Anderson et al. |
| 3,788,207 A | 1/1974 | Doherty, II |
| 3,798,851 A | 3/1974 | Utahara |
| 3,817,009 A | 6/1974 | Elder |
| 3,828,491 A | 8/1974 | Koon et al. |
| 3,893,383 A | 7/1975 | Jones |
| 3,943,671 A | 3/1976 | Curci |
| 3,984,947 A | 10/1976 | Patry |
| 4,016,730 A | 4/1977 | DeVilliers |
| 4,160,340 A | 7/1979 | Levett |
| 4,162,597 A | 7/1979 | Kelly |
| 4,223,486 A | 9/1980 | Kelly |
| 4,258,511 A | 3/1981 | Strain |
| 4,268,066 A | 5/1981 | Davis |
| 4,438,606 A | 3/1984 | Chardon et al. |
| 4,512,243 A | 4/1985 | Ballard et al. |
| 4,538,508 A | 9/1985 | Ballard |
| 4,557,081 A | 12/1985 | Kelly |
| 4,593,504 A | 6/1986 | Bonnici et al. |
| 4,596,181 A | 6/1986 | Kolt |
| 4,608,792 A | 9/1986 | Gerber |
| 4,635,412 A | 1/1987 | Le Poittevin |
| 4,641,571 A | 2/1987 | Anderson et al. |
| 4,652,321 A | 3/1987 | Greko |
| 4,653,238 A | 3/1987 | Berman |
| 4,759,272 A | 7/1988 | Zaniewski |
| 4,788,802 A | 12/1988 | Wokas |
| 4,794,717 A | 1/1989 | Horsmann |
| D299,753 S | 2/1989 | Virgilio |
| 4,803,111 A | 2/1989 | Mansell |
| 4,843,794 A | 7/1989 | Holtgreve |
| 4,848,653 A | 7/1989 | Van Becelaere |
| 4,850,166 A | 7/1989 | Taylor |
| 4,854,094 A | 8/1989 | Clark |
| 4,876,950 A | 10/1989 | Rudeen |
| 4,888,930 A | 12/1989 | Kelly |
| 4,909,135 A | 3/1990 | Greko |
| 4,963,761 A | 10/1990 | Wight |
| 4,965,971 A | 10/1990 | Jean-Jacques et al. |
| 5,009,149 A | 4/1991 | MacLeod et al. |
| 5,431,240 A | 7/1995 | Merritt |
| 5,470,188 A * | 11/1995 | Ebato .................. B60P 1/4414 414/540 |
| D369,670 S | 5/1996 | Queen |
| 5,662,453 A * | 9/1997 | Gerstner .................. B60P 1/02 293/118 |
| 5,734,215 A | 3/1998 | Taghezout et al. |
| 5,749,780 A | 5/1998 | Harder et al. |
| 5,766,071 A | 6/1998 | Kirkwood |
| 5,769,011 A | 6/1998 | Daniel |
| D397,800 S | 9/1998 | Acevedo-Arjona et al. |
| 5,819,477 A | 10/1998 | Gaffney |
| D415,571 S | 10/1999 | Goldwitz |
| 5,966,956 A | 10/1999 | Morris et al. |
| 6,006,482 A | 12/1999 | Kelly |
| 6,032,421 A | 3/2000 | Yamada |
| 6,325,712 B1 | 12/2001 | Lawless, III et al. |
| 6,484,459 B1 | 11/2002 | Platts |
| 6,591,564 B2 | 7/2003 | Cusimano |
| D490,533 S | 5/2004 | Lockwood |
| 7,001,266 B2 | 2/2006 | Jones et al. |
| 7,036,786 B1 | 5/2006 | Schura |
| D568,495 S | 5/2008 | Kennedy et al. |
| 7,373,757 B2 | 5/2008 | Hampel |
| 7,543,594 B2 | 6/2009 | Novak |
| 7,717,290 B2 | 5/2010 | Gerding |
| 7,926,240 B1 | 4/2011 | Jacovitz |
| 7,937,895 B2 | 5/2011 | Janka et al. |
| 8,136,303 B2 | 3/2012 | Scott, IV |
| 8,245,450 B2 | 8/2012 | Scott |
| 8,322,084 B2 | 12/2012 | Kestermann |
| 8,375,642 B1 | 2/2013 | Scott, IV |
| D685,921 S | 7/2013 | Scott, IV |
| 8,534,001 B2 | 9/2013 | Scott, IV |
| 8,925,934 B2 * | 1/2015 | Anderson .............. B60G 17/00 280/6.151 |
| 8,955,262 B2 | 2/2015 | Thompson et al. |
| 9,073,590 B2 * | 7/2015 | Fox ...................... B62D 63/061 |
| 2003/0024173 A1 | 2/2003 | Cohen |
| 2003/0126805 A1 | 7/2003 | Roberts |
| 2004/0123529 A1 | 7/2004 | Wiese et al. |
| 2005/0166477 A1 | 8/2005 | Chu |
| 2005/0235819 A1 | 10/2005 | Long |
| 2006/0016134 A1 | 1/2006 | Luchinger et al. |
| 2006/0048458 A1 | 3/2006 | Donald et al. |
| 2007/0020073 A1 * | 1/2007 | Chaddock .............. B60P 1/027 414/483 |
| 2007/0094943 A1 | 5/2007 | Deisenroth et al. |
| 2008/0060691 A1 | 3/2008 | Harker |
| 2008/0313974 A1 | 12/2008 | Kmet et al. |
| 2009/0031621 A1 | 2/2009 | Kitagawa |
| 2009/0217600 A1 | 9/2009 | De Azambuja |
| 2010/0043308 A1 | 2/2010 | Keeble |
| 2010/0320708 A1 | 12/2010 | Pope |
| 2011/0067321 A1 | 3/2011 | Hijazi |
| 2011/0083380 A1 | 4/2011 | Thomas |
| 2012/0151851 A1 | 6/2012 | Cantin et al. |
| 2012/0192503 A1 | 8/2012 | Connell |

OTHER PUBLICATIONS

Oscar T. Scott IV, U.S. Appl. No. 12/579,004, Final Office Action dated Jun. 14, 2011.
Oscar T. Scott IV, U.S. Appl. No. 12/579,004, Notice of Allowance dated Dec. 1, 2011.
Oscar T. Scott IV, U.S. Appl. No. 13/328,000, Notice of Allowance dated Apr. 5, 2012.
Oscar T. Scott IV, U.S. Appl. No. 13/540,795, Notice of Allowance dated Dec. 20, 2012.
Oscar T. Scott IV, U.S. Appl. No. 13/743,942, Restriction Requirement dated Apr. 15, 2013.
Oscar T. Scott IV, U.S. Appl. No. 13/743,942, Non-Final Office Action dated May 10, 2013.
Oscar T. Scott IV, U.S. Appl. No. 13/743,942, Notice of Allowance dated Jun. 10, 2013.
Oscar T. Scott IV, U.S. Appl. No. 29/443,443, Non-Final Office Action dated Apr. 1, 2013.

(56) References Cited

OTHER PUBLICATIONS

Oscar T. Scott IV, U.S. Appl. No. 29/443,443, Notice of Allowance dated May 21, 2013.
Oscar T. Scott IV, U.S. Appl. No. 13/917,851, Non-Final Office Action dated Oct. 18, 2013.
Oscar T. Scott IV, U.S. Appl. No. 13/917,851, Final Office Action dated Nov. 28, 2014.
Oscar T. Scott IV, U.S. Appl. No. 13/917,851, Notice of Allowance dated Feb. 17, 2015.
Oscar T. Scott IV, U.S. Appl. No. 13/917,851, New Notice of Allowance dated May 22, 2015.
Oscar T. Scott IV, U.S. Appl. No. 14/251,367, Non-Final Office Action dated Jul. 15, 2014.
Oscar T. Scott IV, U.S. Appl. No. 14/251,367, Notice of Allowance dated Oct. 20, 2014.
Oscar T. Scott IV, U.S. Appl. No. 14/833,898, Non-Final Office Action dated Nov. 20, 2015.
Oscar T. Scott IV, U.S. Appl. No. 14/833,898, Notice of Allowance dated Mar. 11, 2016.
Photographs of prior art shelters, Mar. 2014.
JLG® TRIPLE-L® Trailers Brochure, JLG Industries, Inc., downloaded Apr. 11, 2016 www.jlg.com.
Air-tow Trailers Brochure, Rock Line Products Inc., downloaded Apr. 11, 2016 www.airtow.com.

* cited by examiner

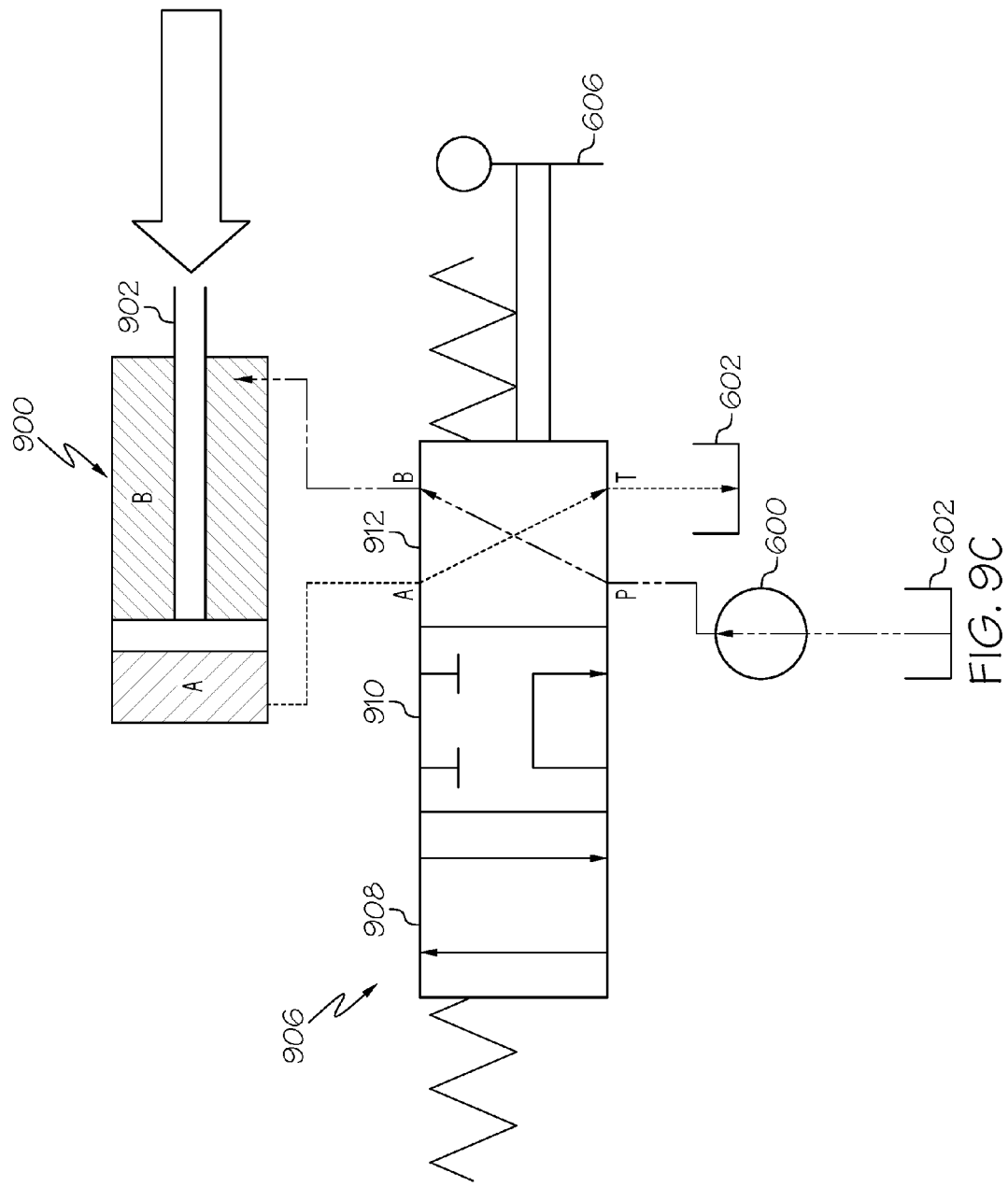

MOBILE SAFETY PLATFORM WITH INTEGRAL TRANSPORT

PRIORITY CLAIM

The present application claims priority under 35 U.S.C. 119(e) to U.S. Ser. Nos. 62/145,235 and 62/280,039, which are incorporated herein by reference in their entireties.

BACKGROUND OF THE INVENTION

A mobile protective shelter is disclosed in U.S. Pat. No. 8,534,001, which is incorporated herein by reference.

BRIEF SUMMARY

Prior art mobile protective shelters, such as those disclosed in U.S. Pat. No. 8,534,001, represent a significant advance over prior protective shelters requiring concrete foundations, earth anchors, or other means of securing the protective shelter to a substrate (e.g., the underlying ground). However, the present disclosure appreciates that the logistics and expense associated with the transportation of prior art mobile protective shelters represents a limitation to their use. Accordingly, the present disclosure discloses a mobile safety platform that reduces the logistics and expense associated with transportation of the mobile safety platform by providing an integral transport.

In some embodiments, a mobile safety platform includes a protective enclosure coupled to a frame of a wheeled transport. The wheeled transport is configured to raise the protective enclosure so that the wheeled transport can relocate the protective enclosure and to lower the protective enclosure so that the protective enclosure and/or deck is deployed on a substrate. In at least one embodiment, the wheeled transport is configured to raise and to lower the protective enclosure utilizing a lifting and lowering mechanism, such as a hydraulic system. In at least one embodiment, the lifting and lowering mechanism is configured, when deployed, to transfer at least some of the weight of the transport to the protective enclosure and/or deck. In at least one embodiment, the wheeled transport comprises a trailer. In other embodiments, the wheeled transport can be a motor vehicle including an engine.

BRIEF DESCRIPTION OF THE SEVERAL VIEWS OF THE DRAWINGS

FIGS. 9A-9C are schematic views of a second embodiment of a hydraulic system including a double acting hydraulic cylinder and a three-position, four-way control valve;

DETAILED DESCRIPTION

Figure 1:
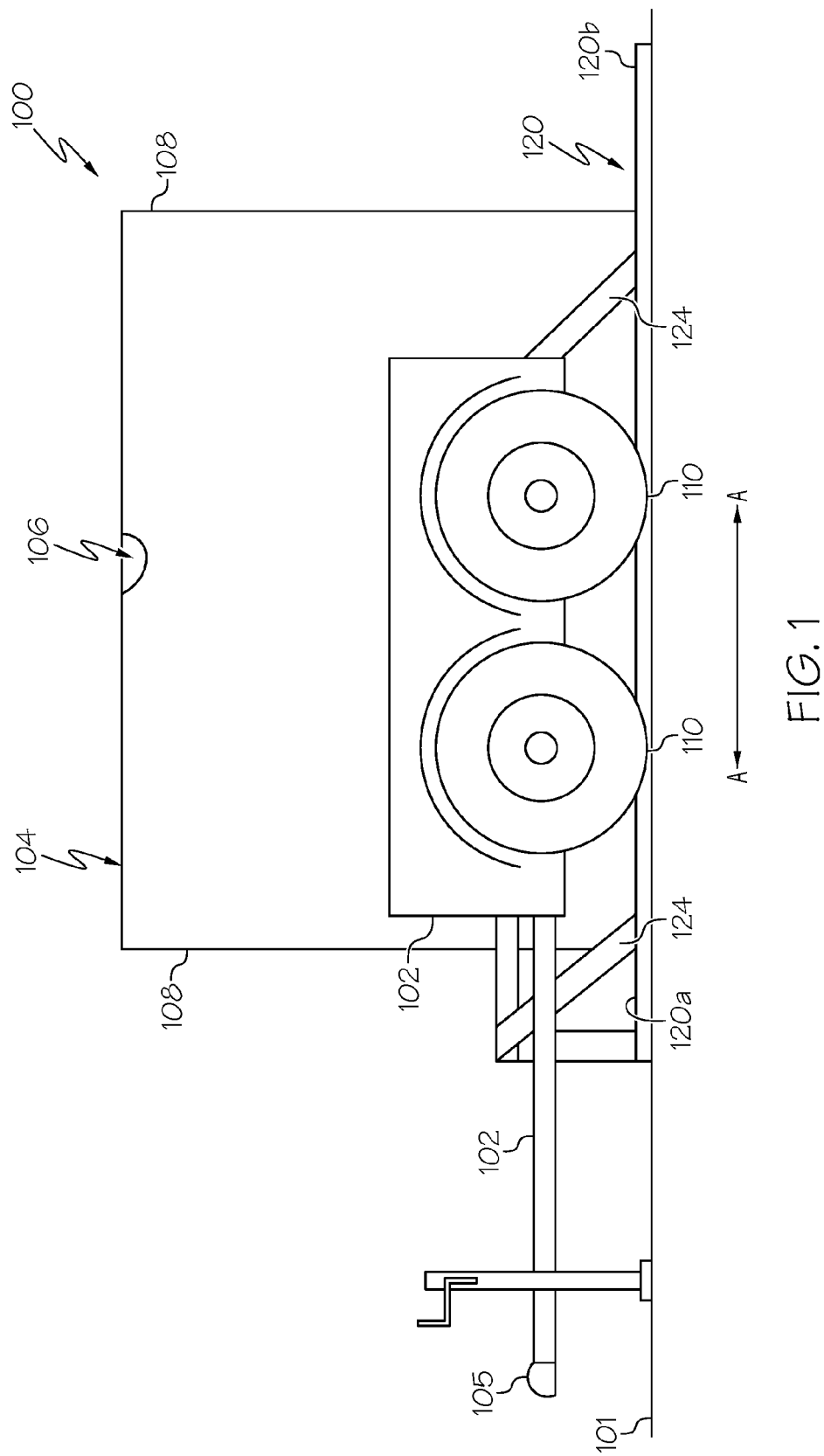
FIG. 1 is a side elevation view of a mobile safety platform in its deployed configuration in accordance with a first embodiment.
Figure 2:
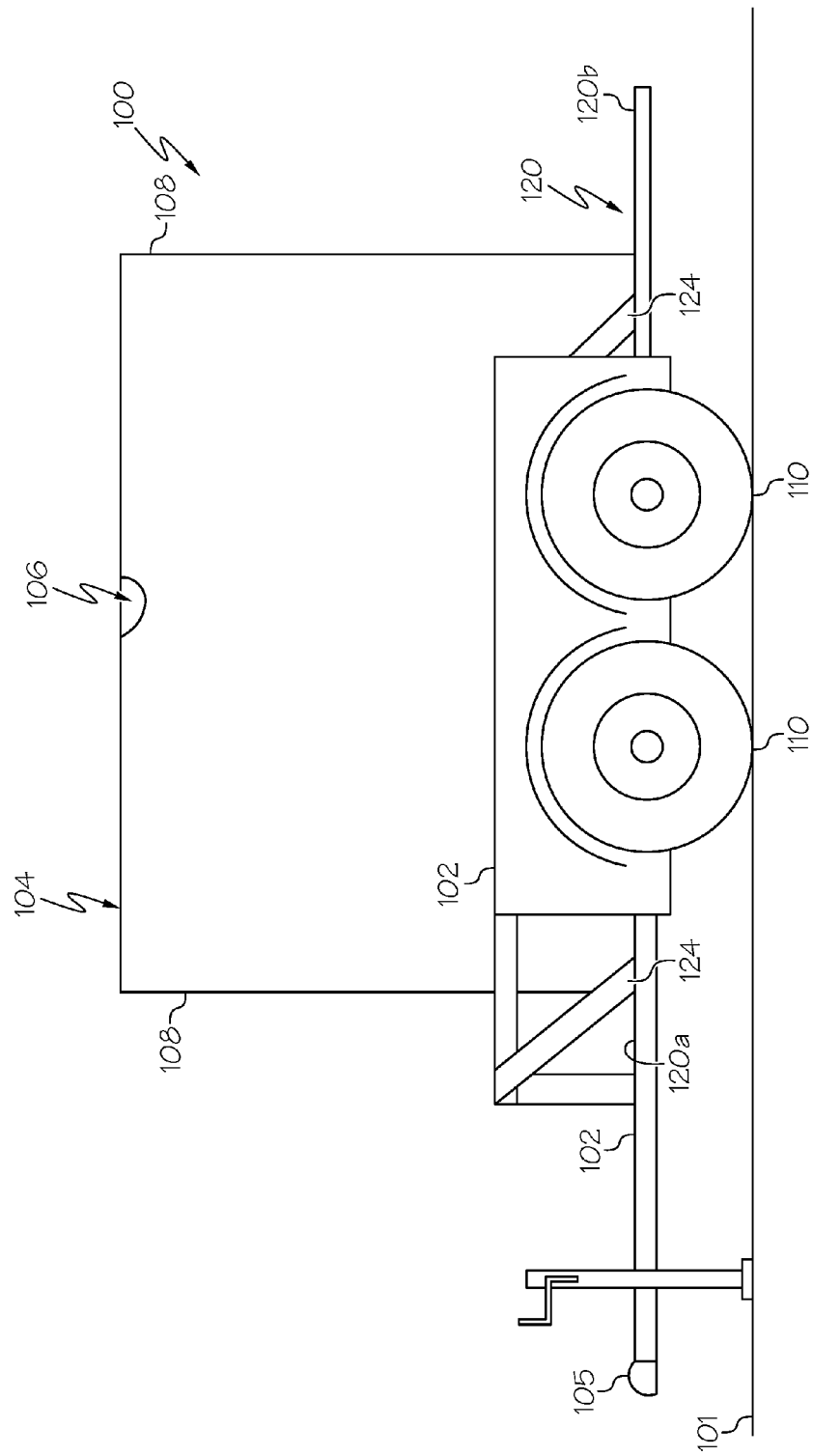
FIG. 2 is a side elevation view of a mobile safety platform in its roadable/towable configuration in accordance with a first embodiment.
Figure 3:
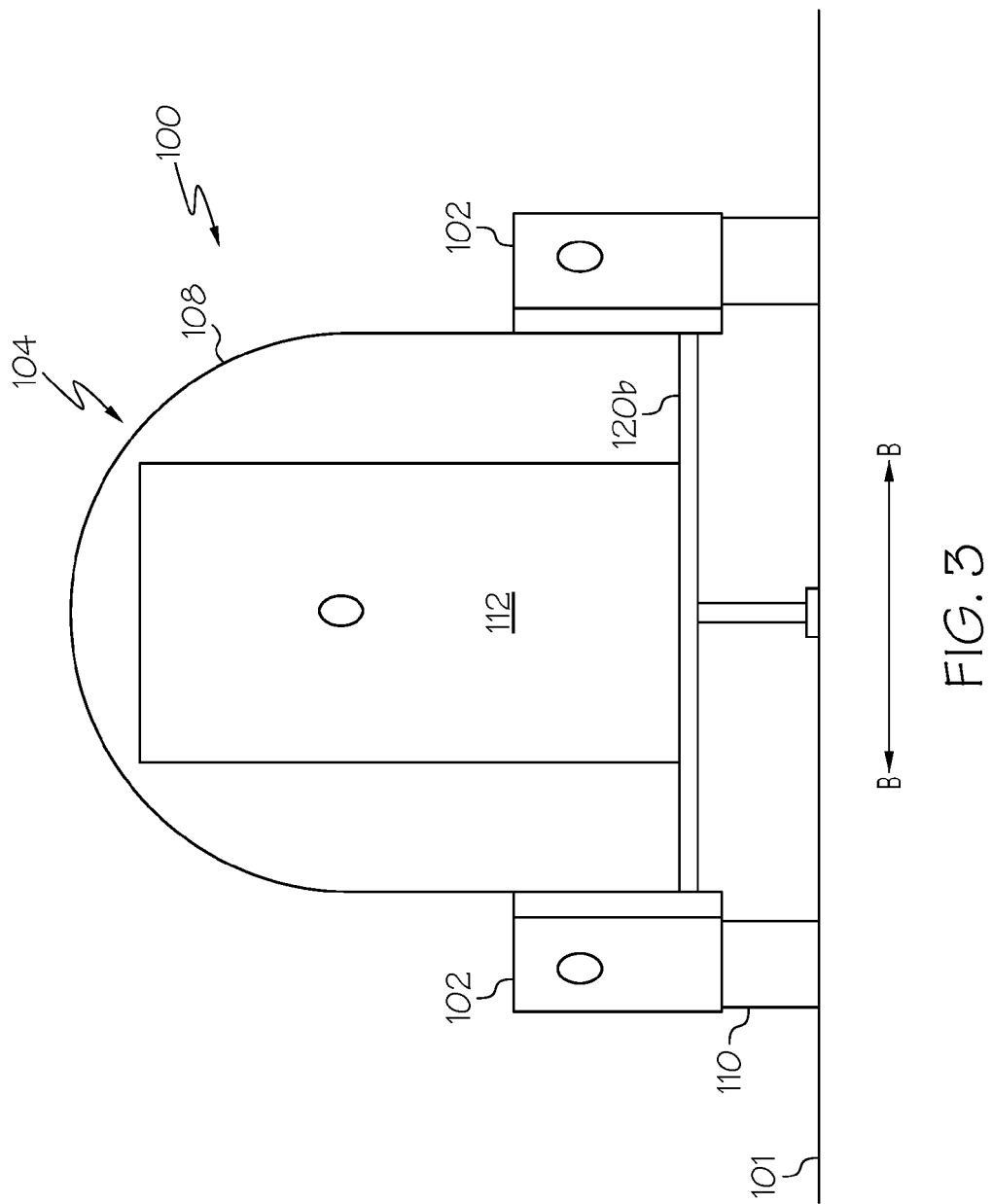
FIG. 3 is a rear elevation view of a mobile safety platform in its roadable/towable configuration in accordance with a first embodiment.
Figure 4:
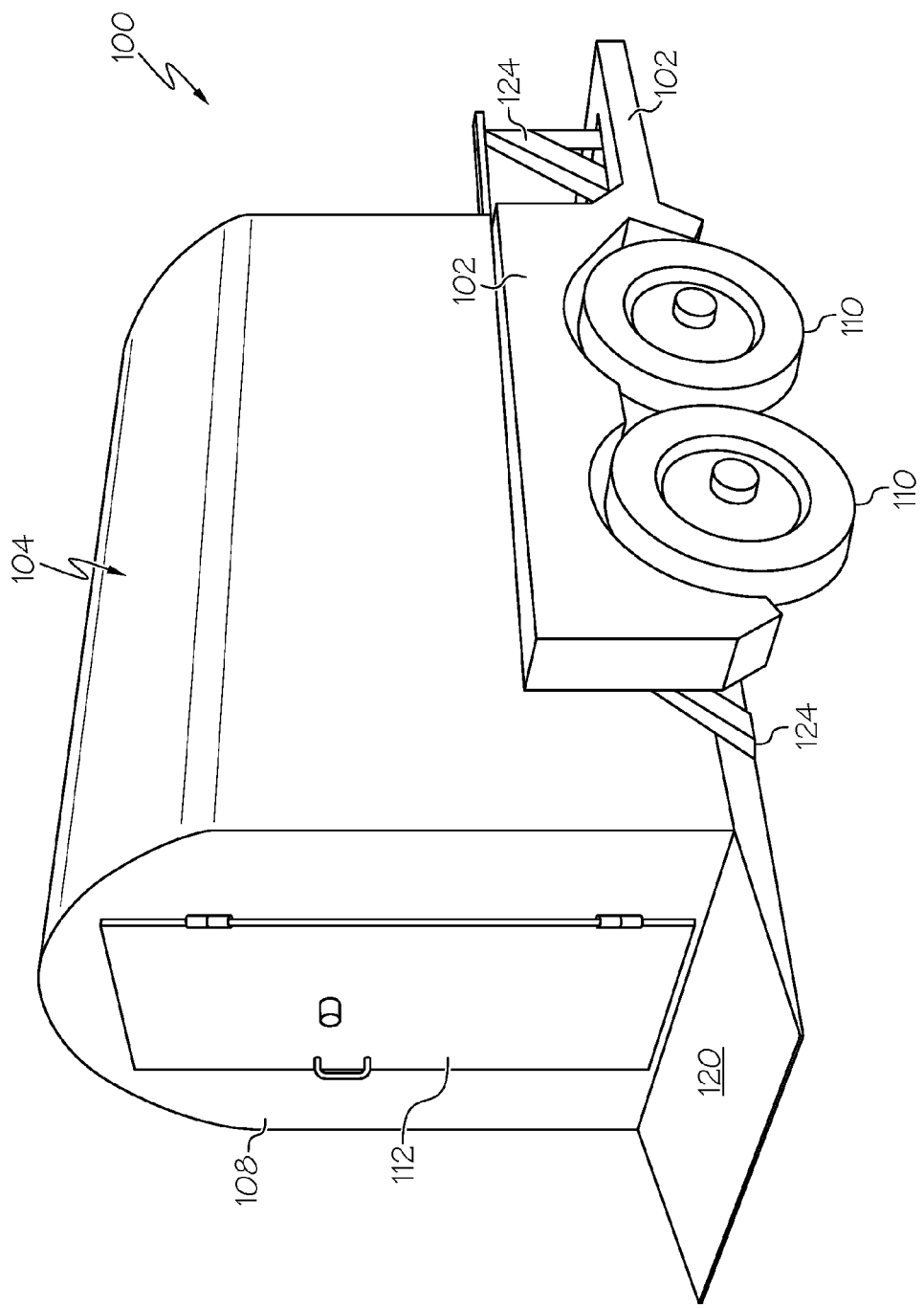
FIGS. 4-5 are perspective views of a mobile safety platform in its roadable/towable configuration in accordance with a first embodiment.
Figure 5:
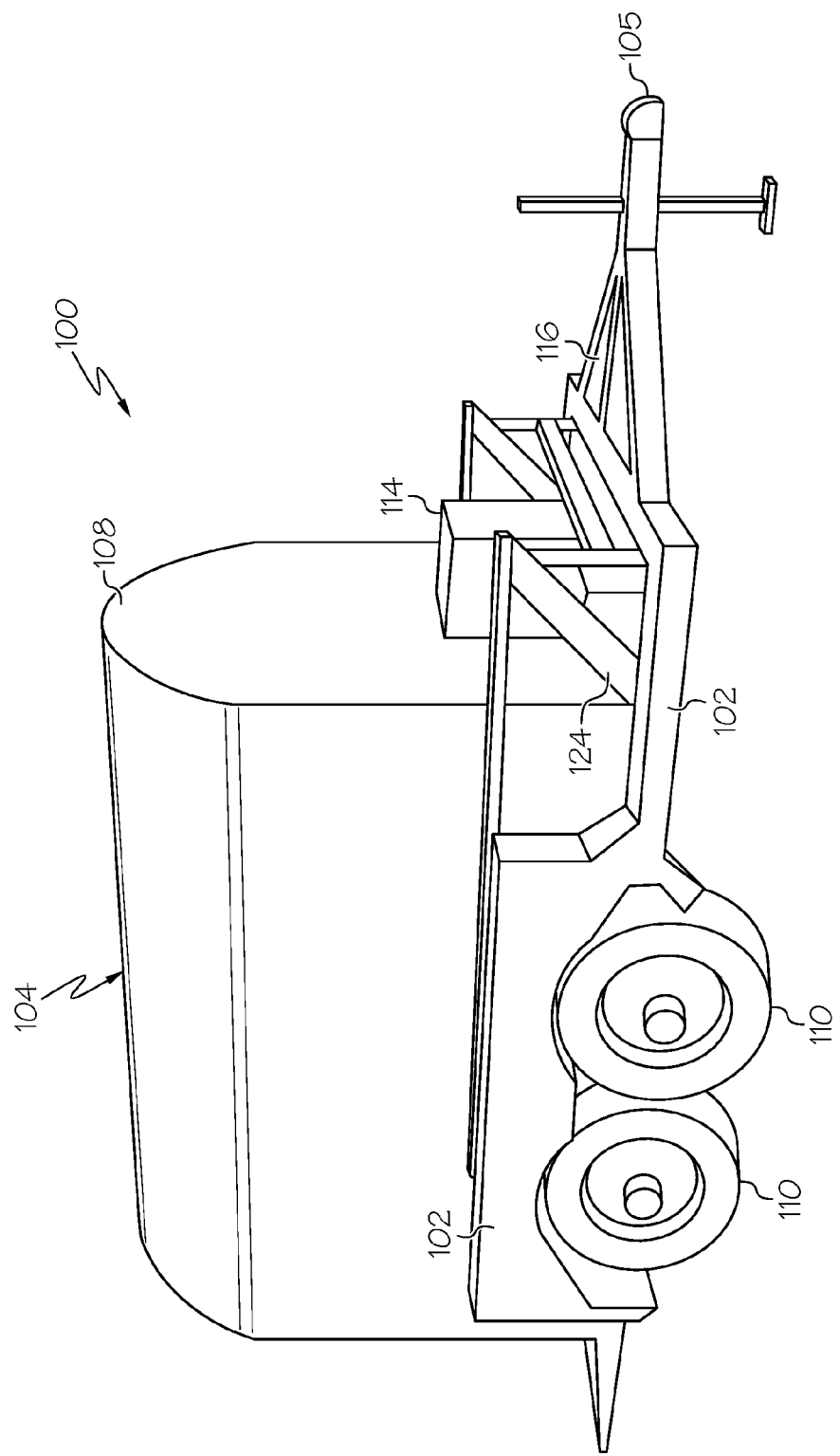

With reference now to the figures and with particular reference to FIGS. 1-5, there are illustrated various views of a mobile safety platform 100 in accordance with a first embodiment. In the illustrated embodiment, mobile safety platform 100 includes a frame 102, two or more wheels 110 coupled to frame 102 (e.g., via one or more axle assemblies), and a protective enclosure 104 coupled to (e.g., bolted, clamped, and/or welded to) a movable deck 120 that is in turn coupled to frame 102 and that can be raised and lowered relative to frame 102. Although a wide variety of shapes and sizes of mobile safety platform 100 and protective enclosure 104 can be employed, the presently preferred shapes and sizes fall within state and federal Department of Transportation (DOT) height, width, length and weight limits for non-permitted loads on public roadways. For example, in various embodiments, mobile safety platform 100 can have a gross weight of between 6,000 and 15,000 lbs and a FEMA-rated capacity of up to 15 or more occupants. Mobile safety platform 100 is thus preferably readily transportable and redeployable using any of a number of vehicles, such as a truck (e.g., half-ton, three-quarter ton, or one-ton pickup truck), which can be coupled and decoupled from mobile safety platform 100 via a conventional trailer coupler 105. Of course, in other embodiments, mobile safety platform 100 can be constructed integrally with a motor vehicle, such as a truck. Because mobile safety platform 100 includes its own integral wheeled transport, transportation costs are reduced as compared to alternative mobile shelter designs requiring transportation by a separate semi-trailer truck (e.g., one having a flatbed trailer onto which equipment can be loaded and unloaded via a winch and cable).

For example, in one implementation, mobile safety platform 100 can be implemented by mounting a protective enclosure 104 (e.g., as described in U.S. Pat. No. 8,534,001) on a specially configured ground level loading trailer. (Examples of conventional ground level loading trailers include the Air-tow™ trailer available from Rock Line Products Inc and the Triple-L® drop deck trailer available from JLG Industries, Inc.) In this implementation, the standard steel deck plate of the ground level loading trailer can be omitted, and the deck 120 of protective enclosure 104 can be movably coupled to frame 102. Alternatively, a separate floor plate of protective enclosure 104 can be omitted, and the walls of protective enclosure 104 can be coupled (e.g., welded or bolted) to the standard steel deck plate provided with the trailer.

In the first embodiment, protective enclosure 104 is realized as a safe room formed of a barrel-vault (formed of two side walls and a curved roof best seen in FIGS. 3-5), two vertical end walls 108 and a floor plate (e.g., the portion of the deck plate circumscribed by the two side walls and two end walls 108), which can all be formed, for example, of 0.5 inch thick A36 steel plate. In the illustrated embodiment, at least one end wall 108 has an opening (e.g., an ADA-compliant doorway or escape hatch opening) formed therein that is sized for human ingress and egress. Each such opening can be closed by an escape hatch or by a door 112 (in-swing or out-swing) coupled to the end wall 108.

In the first embodiment, deck 120 has a longer dimension along an axis A-A and a shorter dimension along an orthogonal axis B-B. In other embodiments, this need not be the case. Deck 120 preferably (but not necessarily) includes at least one deck section 120a and/or 120b extending beyond protective enclosure 104. In some implementations, protective enclosure 104 is centrally mounted on deck 120 along axis A, and deck 120 includes two deck sections 120a, 120b extending outwardly from end walls 108 of protective enclosure 104 along axis A. In yet other implementations, the floor area of protective enclosure 104 is substantially coextensive with the area of deck 120.

In some embodiments, mobile safety platform 100 and protective enclosure 104 can be implemented as described in U.S. Pat. No. 8,534,001 referenced above. In at least one such embodiment, protective enclosure 104 includes at least one opening 106 providing air communication between an exterior point of relative low pressure during a high velocity wind event (e.g., a peak of the curved roof of protective enclosure 104) and a substantially enclosed subfloor region formed beneath deck 120 when mobile safety platform 100 is in its deployed configuration, as shown, for example, in FIG. 1. In various embodiments, this air communication is confined to one or more ducts. The duct(s) may pass through the central volume and/or walls of protective enclosure 104 or can simply be implemented by using the interior volume of protective enclosure 104 as a "duct." The air communication between an exterior region of protective enclosure 104 and the subfloor region produces a vacuum effect that resists overturning, sliding and uplift forces generated by high velocity wind events. In such embodiments, the inclusion of deck sections 120a and/or 120b extending beyond the footprint of protective enclosure 104 advantageously increases the area over which this vacuum effect works. It should be understood, however, that in other embodiments, such air communication can be omitted. For example, in one such alternative embodiment, protective enclosure 104 can be implemented as described in U.S. Pat. No. 8,955,262.

In accordance with one aspect of the embodiments disclosed herein, mobile safety platform 100 is reconfigurable between a deployed configuration (as shown in FIG. 1) and a roadable/towable configuration (as shown in FIGS. 2-5). To this end, mobile safety platform 100 preferable includes a lifting and lowering mechanism (not explicitly illustrated in FIGS. 1-5), which can include electrical, mechanical, pneumatic, or hydraulic components (or combinations thereof). The lifting and lowering mechanism enables the mobile safety platform 100 to be rapidly and selectably reconfigured between the deployed configuration and roadable/towable configuration. In a particularly preferred embodiment, the lifting and lowering mechanism is capable of at least partially, and more preferably fully, lifting the full weight of wheels 110, the associated axle assemblies, and the frame 102 from the substrate 101 when mobile safety platform 100 is in the deployed configuration (as shown in FIG. 1). When configured in this manner, the addition of the full weight of frame 102 and wheels 110 as ballast increases the resistance of mobile safety platform 100 to uplift, overturning and sliding forces. Consequently, depending upon the desired design parameters, the mobile safety platform can achieve a higher design wind speed or can alternatively be safely constructed of lighter weight materials and still withstand the forces created by a high design wind speed (e.g., 250 mph).

Figure 6:
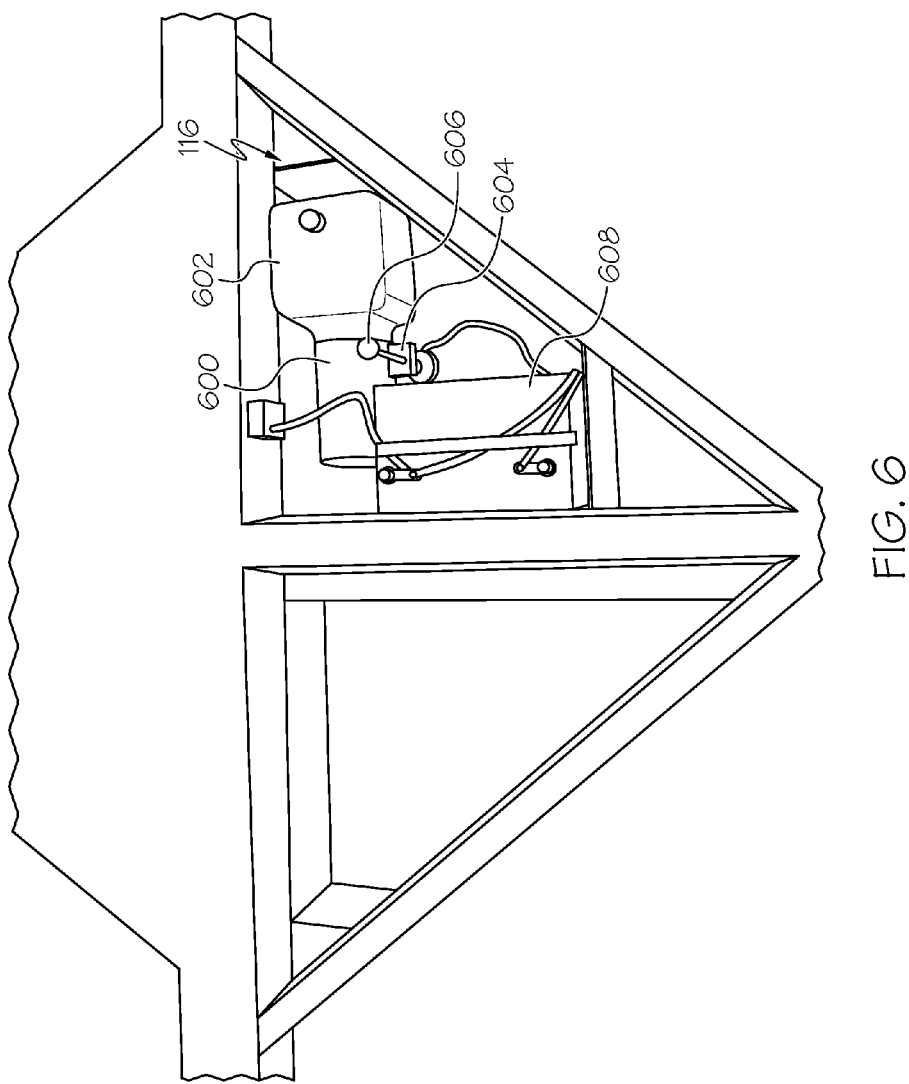
FIGS. 6-7 depict a hydraulic system that may be utilized in one or more embodiments to reconfigure a mobile safety platform between its deployed and roadable/towable configurations.
Figure 7:
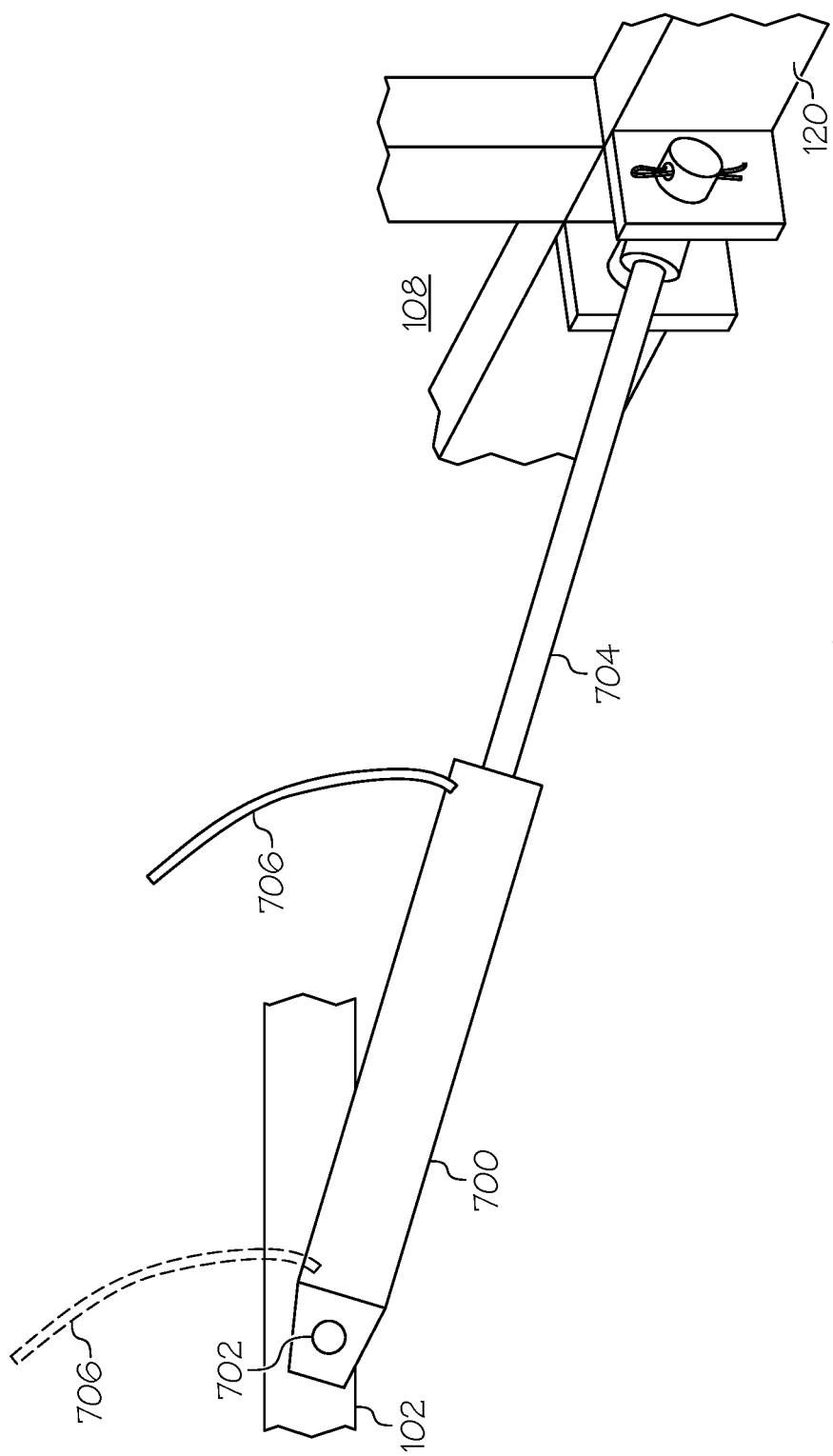

As one example of a suitable lifting and lowering mechanism, additional reference is now made to FIGS. 6-7, which depict a hydraulic system that may be utilized in one or more embodiments to reconfigure a mobile safety platform 100 between its deployed and roadable/towable configurations. FIG. 6 illustrates that frame 102 may include an equipment compartment 116 that houses a hydraulic pump 600, an associated hydraulic fluid storage tank 602, a valve 604 controlled by a control lever 606, and a power source for hydraulic pump 600, such as 12 V battery 608. In other embodiments, the pump 600 may alternatively be powered by an on-board generator and/or a power source integrated in the towing vehicle.

As shown in FIG. 7, hydraulic pump 600 drives at least one hydraulic cylinder 700, which in this example includes a hydraulic cylinder mount 702 coupled to frame 102 and a rod 704 coupled to deck 120. Hydraulic cylinder 700 further includes one or more hydraulic fluid ports coupled to valve 604 by one or more hydraulic lines 706, depending on whether hydraulic cylinder 700 is a single acting cylinder (in which case, hydraulic cylinder 700 has an air port and a single fluid port coupled to valve 604 by a single hydraulic line 706) or a double acting cylinder (in which case, hydraulic cylinder 700 has two fluid ports coupled to valve 604 by respective hydraulic lines 706).

Figure 8:
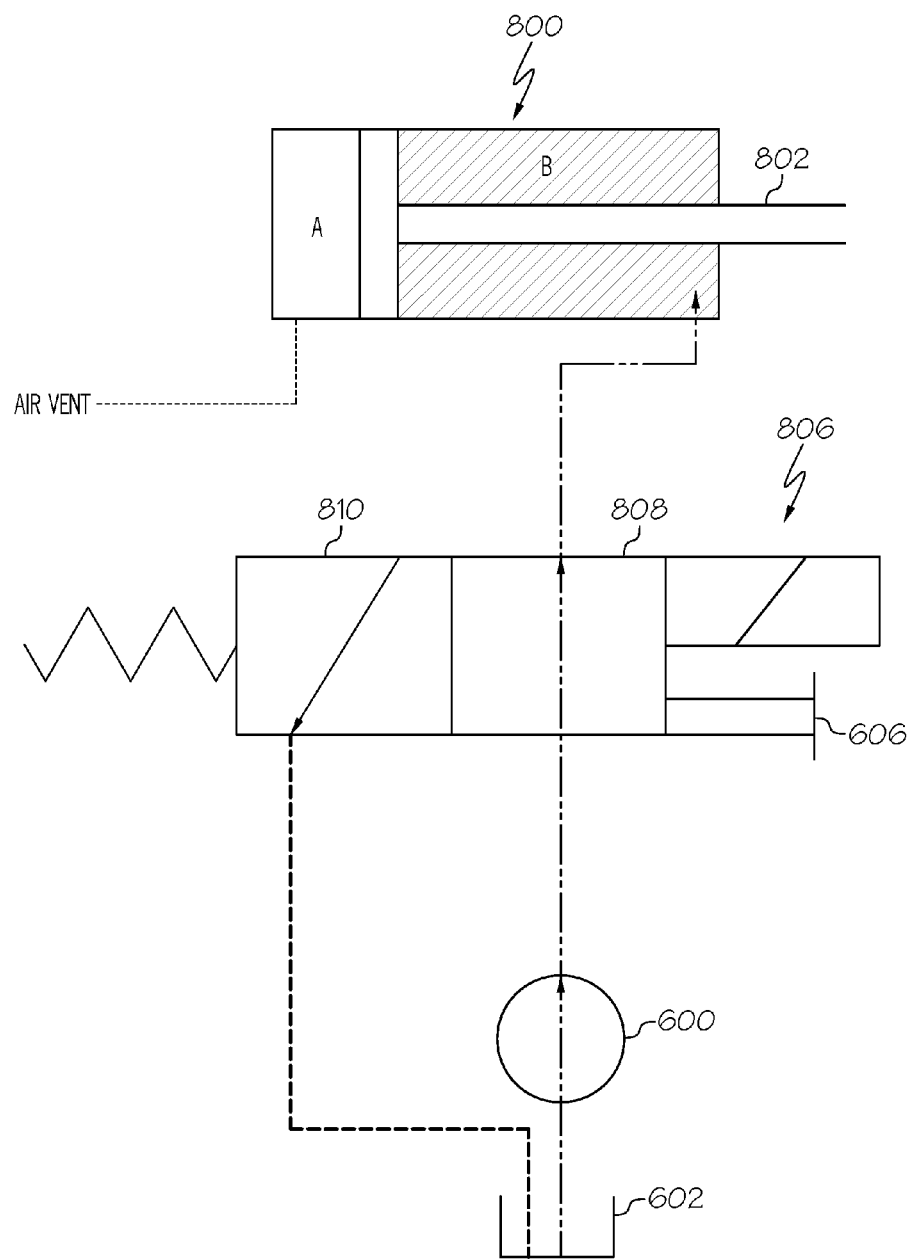
FIG. 8 depicts a schematic view of a first embodiment of a hydraulic system including a single acting hydraulic cylinder and a two-position, two-way control valve.

Referring now to FIG. 8, there is depicted a schematic diagram of a hydraulic lifting and lowering mechanism employing a single acting hydraulic cylinder in accordance with one embodiment. In this embodiment, hydraulic cylinder 700 of FIG. 7 is implemented with a single acting hydraulic cylinder 800, and valve 604 of FIG. 6 is implemented with a manual two-position, two-way control valve 806. Single acting hydraulic cylinder 800 includes a piston 802, which defines two interior chambers within hydraulic cylinder 800, namely, a head side chamber A and a piston rod side chamber B.

In a first valve position 808 (shown in detail in FIG. 8), two-way valve 806 routes hydraulic fluid pumped by hydraulic pump 600 from storage tank 602 to chamber B (i.e., the piston rod side) of hydraulic cylinder 800 to retract piston 802 into hydraulic cylinder 800 and thus raise deck 120 until a desired or maximum elevation of deck 120 is reached. In a second valve position 810, two-way valve 806 drains hydraulic fluid from chamber B of hydraulic cylinder 800 into storage tank 602, and rod 802 extends from hydraulic cylinder 800 due to the weight of protective enclosure 104 and deck 120, thus lowering deck 120 to ground level under the urging of gravity alone. In one or more embodiments, deck 120 may be held substantially level with respect to the substrate 101 when raised and lowered by the inclusion of tracks 124 (see, e.g., FIGS. 2 and 4-5) in which track followers coupled to deck 120 are captured and slidably move.

Figure 9A:
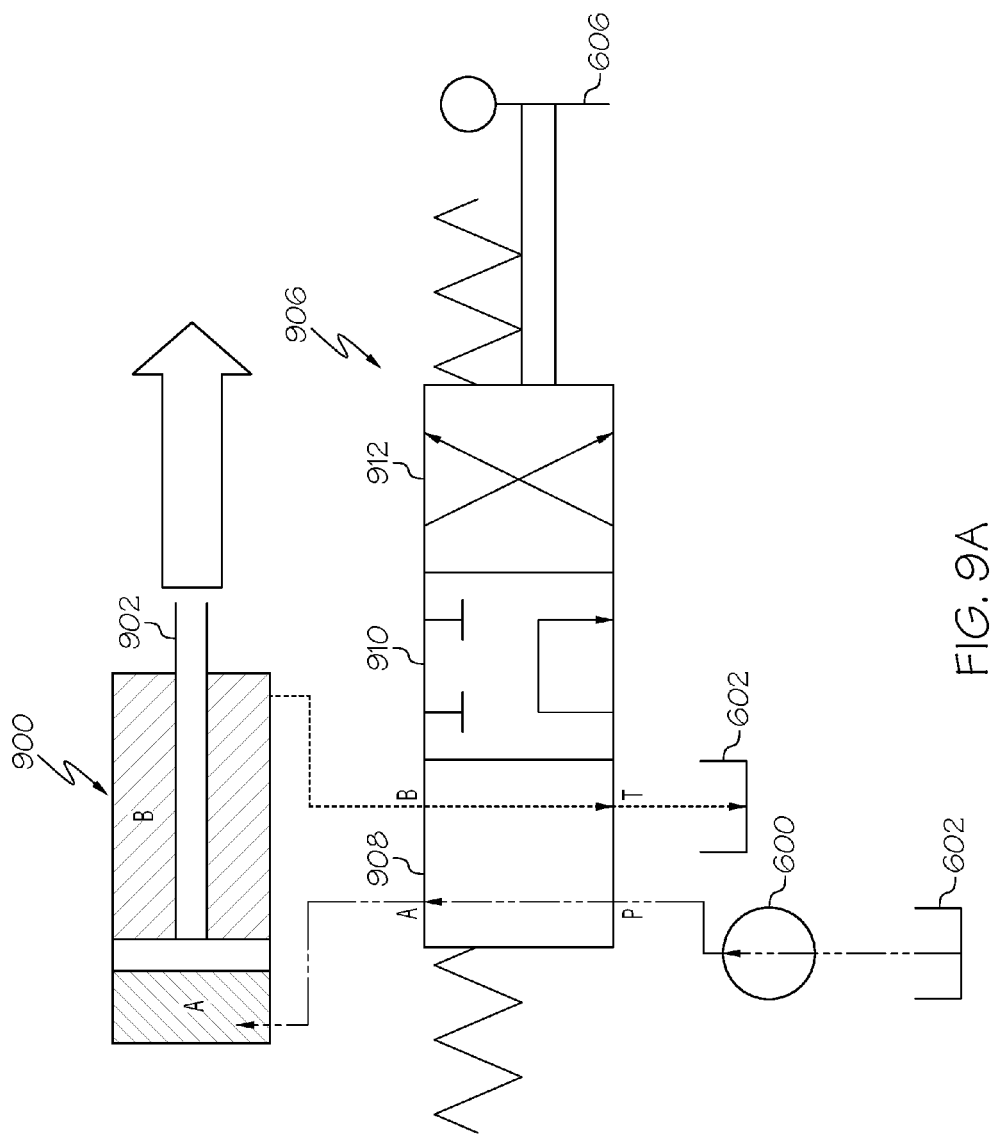
Figure 9B:
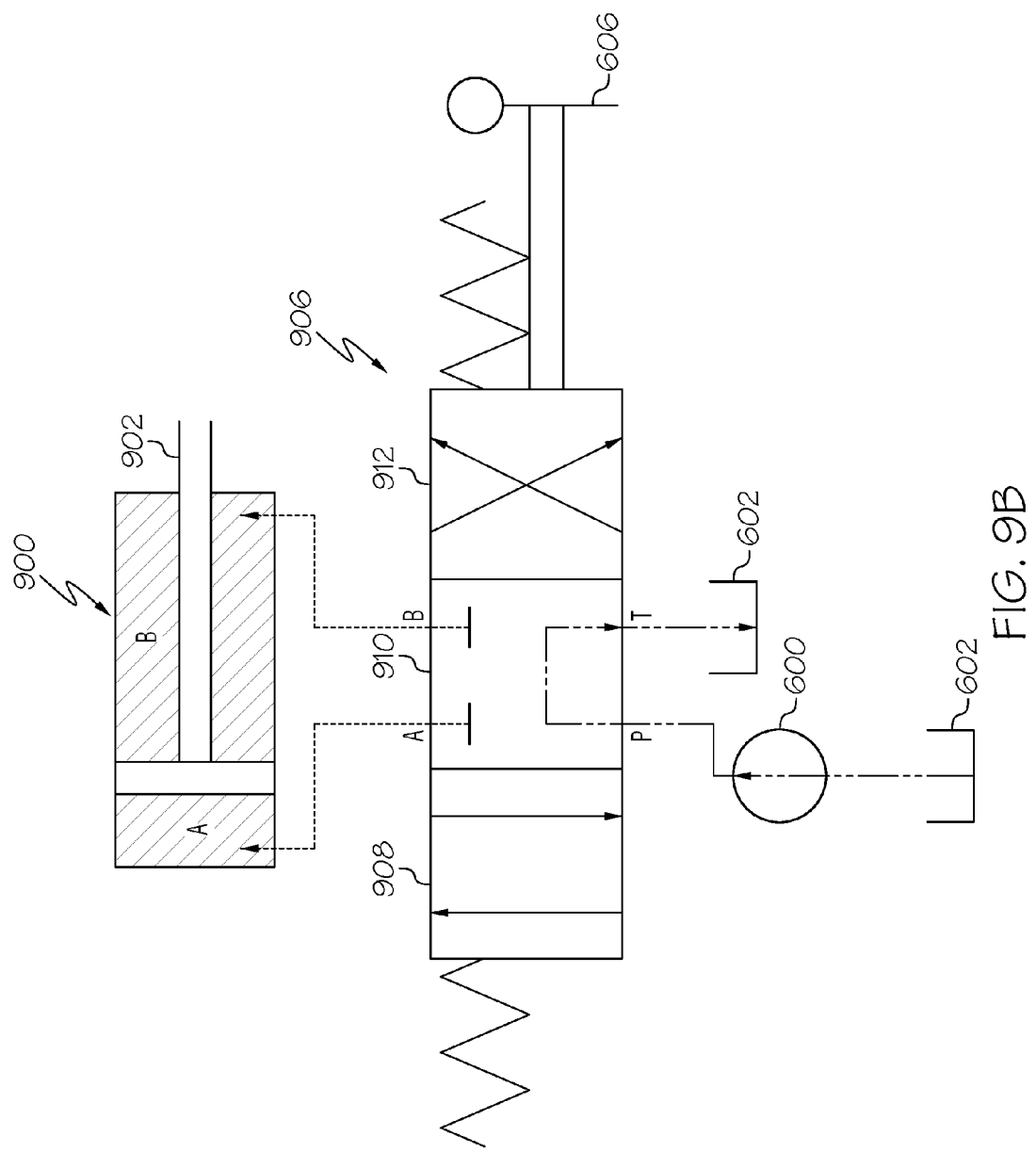

Use of a single acting hydraulic cylinder and two-way control valve as shown in FIG. 8, while effective in raising and lowering movable deck 120, does not permit the weight of wheels 110 and frame 102 to be lifted from substrate 101 in the deployed configuration of mobile safety platform 100 and thus can not be effectively used as ballast for protective enclosure 104. To provide this additional capability, hydraulic cylinder 700 of FIG. 7 can instead be implemented with a double acting hydraulic cylinder 800, and valve 604 of FIG. 6 can be implemented with a three-position, four-way control valve 906, as schematically shown in FIGS. 9A-9C. In this alternative embodiment, the four ports of control valve 906 are connected as follows: (1) Port A is connected to chamber A of hydraulic cylinder 900, (2) Port B is connected to chamber B of cylinder 900, (3) Port P is connected to pump 600, and (4) Port T is connected to storage tank 602.

Control valve 906 has three states (positions) 908, 910 and 912, which in the illustrated embodiment can be manually selected via control lever 606, but in other embodiments can be alternatively or additionally selected via an electronic control. In first valve position 908 illustrated in detail in FIG. 9A, port P is connected to port A, and port B is connected to port T. In first valve position 908, hydraulic fluid flows from pump 600 into chamber A of hydraulic cylinder 900. As chamber A is filled with hydraulic fluid, the hydraulic pressure in chamber A increases. At the same time, hydraulic fluid freely flows from chamber B into storage tank 602 through port T, reducing pressure in chamber B. The pressure imbalance between chambers A and B extends piston 902 from hydraulic cylinder 900, thus lowering deck 120 to the ground. By continuing to power hydraulic cylinder 900 beyond the point that deck 120 contacts substrate 101, frame 102 and wheel assemblies are lifted off the ground, thus transferring at least some and preferably all of the weight of frame 120, wheels 110 and the associated wheel assemblies (which may collectively weigh 3,500 pounds or more) to deck 120 and its protective enclosure 104.

In second valve position 910 depicted in detail in FIG. 9B, ports A and B are closed and unable to communicate with hydraulic cylinder 900, and port P is connected to port T. As a result, piston 902 and deck 120 are held stationary.

Finally, in third valve position 912 shown in FIG. 9C, valve 906 connects port A to port T and connects port P to port B. With this arrangement, pump 600 fills chamber B of hydraulic cylinder 900 with hydraulic fluid, while hydraulic fluid freely drains from chamber A into storage tank 602. The pressure differential between chambers A and B causes piston 902 to retract within hydraulic cylinder 900, thus raising deck 120 to a desired height above substrate 101 and returning the weight of mobile safety platform 100 to wheels 110 (and the hitch of a tow vehicle, if present).

In some embodiments, mobile safety platform 104 can mitigate one or more threats to human personnel and/or assets, including high velocity winds (e.g., 250 miles per hour), hail, fire, lightning, heat and/or cold stress, explosive blasts, workplace violence, toxic chemicals and/or gases (e.g., hydrogen sulfide, sulfur dioxide, etc.), respirable silica, etc. For example, the configuration and/or mass of mobile safety platform 100 protects occupants and assets within protective enclosure 104 from wind-induced overturning, uplift and sliding forces on mobile safety platform 100, impact by hail and/or wind-borne debris, and site-specific laydown, collapse and rollover hazards. Further, in preferred embodiments in which protective enclosure 104 is formed of a metal such as steel, protective enclosure 104 serves as a Faraday cage that protects occupants and assets within protective enclosure 104 against sky-to-ground and ground-to-sky lightning. The metal walls of protective enclosure 104 additionally provide protection for occupants and assets against fire, explosive blasts, domestic terrorism and workplace violence.

Protection of occupants and assets against combustion gases is provided by the hatch closure and sealing system utilized to form a seal between door(s) 112 (or escape hatches) and their corresponding openings. Protective enclosure 104 can optionally be further equipped with $CO^2$ scrubbers and compressed breathing air storage tanks and regulators that create a positive internal pressure to prevent fumes from entering the interior of protective enclosure 104 even if the sealing system of one of doors 112 is compromised. Protective enclosure 104 can optionally be equipped with a HEPA filtration system that provides positive pressure filtered air to occupants, enabling removal of 99.997% or greater of all silica dust 0.3 microns or larger.

Mobile safety platform 100 can additionally provide protection to occupants and assets within protective enclosure 104 from risks associated with exposure to high and/or low temperatures. For example, mobile safety platform 100 can include a temperature control system to promote prevention of and/or recovery from temperature-induced stress. In one example, the temperature control system includes a heating, ventilation and cooling (HVAC) system, such as through-wall HVAC system 114 of FIG. 5.

In accordance with one aspect of the inventions disclosed herein, the surface area of the deck sections 120a or 120b (if present) extending beyond protective enclosure 104 and/or frame 102 can be utilized to support one or more additional pieces of safety-supporting equipment. In various possible configurations, the one or more additional pieces of safety-supporting equipment and electrical power generation equipment can be coupled to one or more of the deck sections 120a, 120b by welding, bolts, clamps, ISO container connectors, etc. It is preferable if one or more of the additional pieces of safety-supporting equipment are removably coupled to frame 102 and/or the deck section(s) 120a, 120b to enable mobile safety platform 100 to be selectively configured to mitigate the hazard(s) of its intended installation site, to be reconfigured (either on site or off site) with one or more different pieces of safety-supporting equipment, and to then be redeployed with an alternative configuration.

Figure 10:
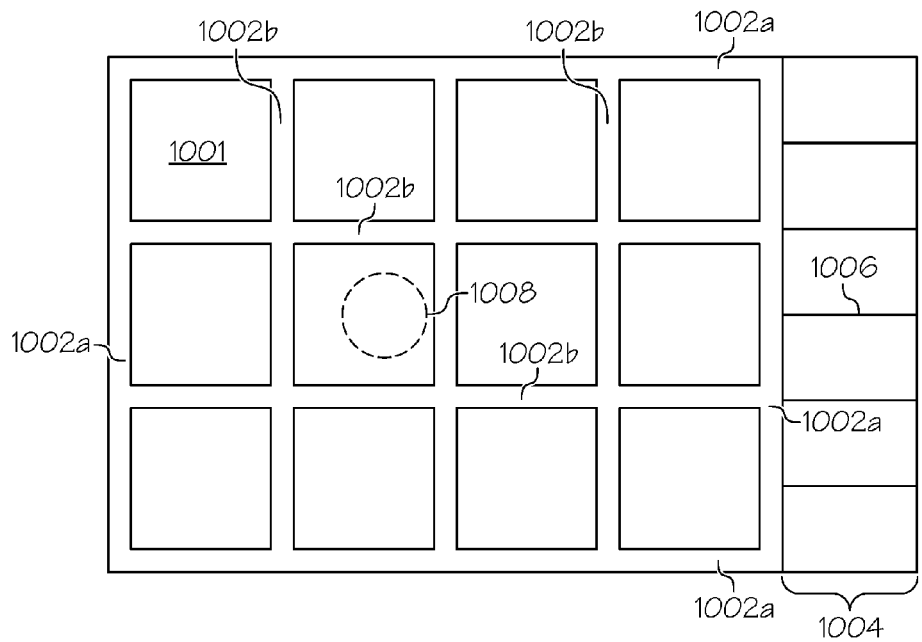
FIG. 10 is a plan view of the underside of a mobile safety platform in accordance with one or more embodiments.

With reference now to FIG. 10, there is illustrated a plan view of the underside of the deck 1000 of a mobile safety platform in accordance with one or more embodiments. In this example, deck 1000 includes a deck plate 1001 which can be formed, for example, from plate steel. Deck plate 1001 may optionally be reinforced by one or more elongate reinforcing members 1002. Although illustrated as coupled (e.g., welded and/or bolted) to the underside of deck plate 1001, it should be appreciated that in at least some embodiments some or all of elongate reinforcing members 1002 may alternatively or additionally be disposed on the upper side of deck plate 1001 (i.e., the same side as protective enclosure 104). Each of elongate reinforcing members 1002 can be formed of, for example, steel channel, square tube, round tube, I-beam, or composite beams having other cross-sectional shapes (including irregular). Those skilled in the art will appreciate that the material, number, location and dimensions of such elongate supporting members 1002 will vary between embodiments based on, inter alia, the selected material and dimensions of deck plate 1001, the configuration of elongate supporting members 1002, and design load of deck 1000 when bearing a protective enclosure.

In the example of FIG. 10, elongate reinforcing members 1002 include both peripheral reinforcing members 1002a and interior reinforcing members 1002b, which in this case form a grid within peripheral reinforcing members 1002a. At one end, deck 1000 terminates in a low-angle sloping ramp 1004 reinforced by tapered (e.g., steel) ribs 1006.

In embodiments of a mobile safety platform configured with an opening 106 and at least one "duct" to channel low pressure beneath mobile safety platform in accordance with the teachings of U.S. Pat. No. 8,534,001, deck plate 1001 preferably includes one or more holes 1008 there through. When the mobile safety platform is configured in a deployed configuration, for example, as shown in FIG. 1, hole(s) 1008 provide airflow communication between a substantially enclosed region below deck 1000 and opening 106. In at least some implementations, the extent of the substantially enclosed region below deck 1000 can be enlarged by omitting one or more of interior reinforcing members 1002b or by forming holes through one or more interior reinforcing members 1002b for airflow communication.

In at least some implementations, the extent of substantially enclosed region below deck 1000 can alternatively or additionally be defined by the addition of grousers to one or more reinforcing members 1002 (e.g., peripheral reinforcing members 1002a). Grousers can be utilized to improve conformance with unlevel substrates 101 (which increases the suction effect provided by the channeling of lower pressure beneath the mobile safety platform), as well as to increase the coefficient of friction of mobile safety platform 100 with respect to substrate 101 (which increases the resistance of the mobile safety platform to sliding and thus increases the wind speed it can be rated as resisting (e.g., 250 mph)). Grousers can be coupled to reinforcing members 1002, for example, by interference fit, adhesive, and/or fasteners (e.g., screws and/or bolts). In some embodiments in which the grouser is formed of or includes an adhesive or sealant (e.g., a two-component polyurethane elastomeric sealant), grousers can self-adhere to reinforcing members 1002.

Figure 11:
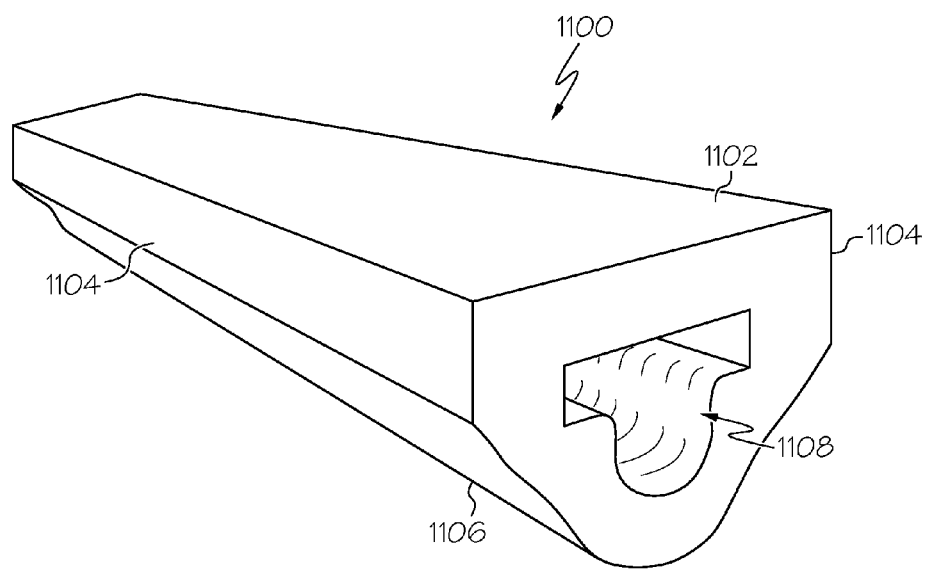
FIG. 11 is section view of a grouser for a mobile safety platform in accordance with one or more embodiments.

FIG. 11 is section view of a grouser 1100 for a mobile safety platform in accordance with one or more embodiments. In FIG. 11, grouser 1100 includes a substantially planar upper wall 1102, two sidewalls 1104, and a curved lower wall 1106. Grousers 1100 can be installed with their substantially planar upper walls 1102 in contact with the undersides of reinforcing members 1002 (e.g., peripheral reinforcing members 1002a). As one example, grouser 1100 can be formed of an ethylene propylene diene monomer (M-class) (EPDM) rubber of high durometer, for example, between about 20-80 durometer and more preferably about 40-70 durometer. In some embodiments, grouser 1100 also includes an internal void 1108 that enables grouser 1100 to compress to more easily conform with the substrate 101. It should be noted that in cases in which the selected material and configuration of grouser 1100 space reinforcing members 1002 from substrate 101, no holes through reinforcing members 1002 are required to provide airflow communication throughout the substantially enclosed subfloor region of a deployed mobile safety platform.

In one preferred embodiment, grousers 1100 are installed along the entire lengths of all peripheral reinforcing members 1002a and are omitted from interior reinforcing members 1002b. In this preferred embodiment, grousers 1100 are designed and configured such that the substantially enclosed subfloor region of a deployed mobile safety platform has a gross area unsealed with respect to the substrate of less than the cumulative area of opening(s) such as opening 106 of FIG. 1.

It should be appreciated that grousers 1100 can be employed regardless of whether or not mobile safety platform is configured with an opening 106 and at least one "duct" to channel low pressure beneath mobile safety platform in accordance with the teachings of U.S. Pat. No. 8,534,001.

Figure 12:
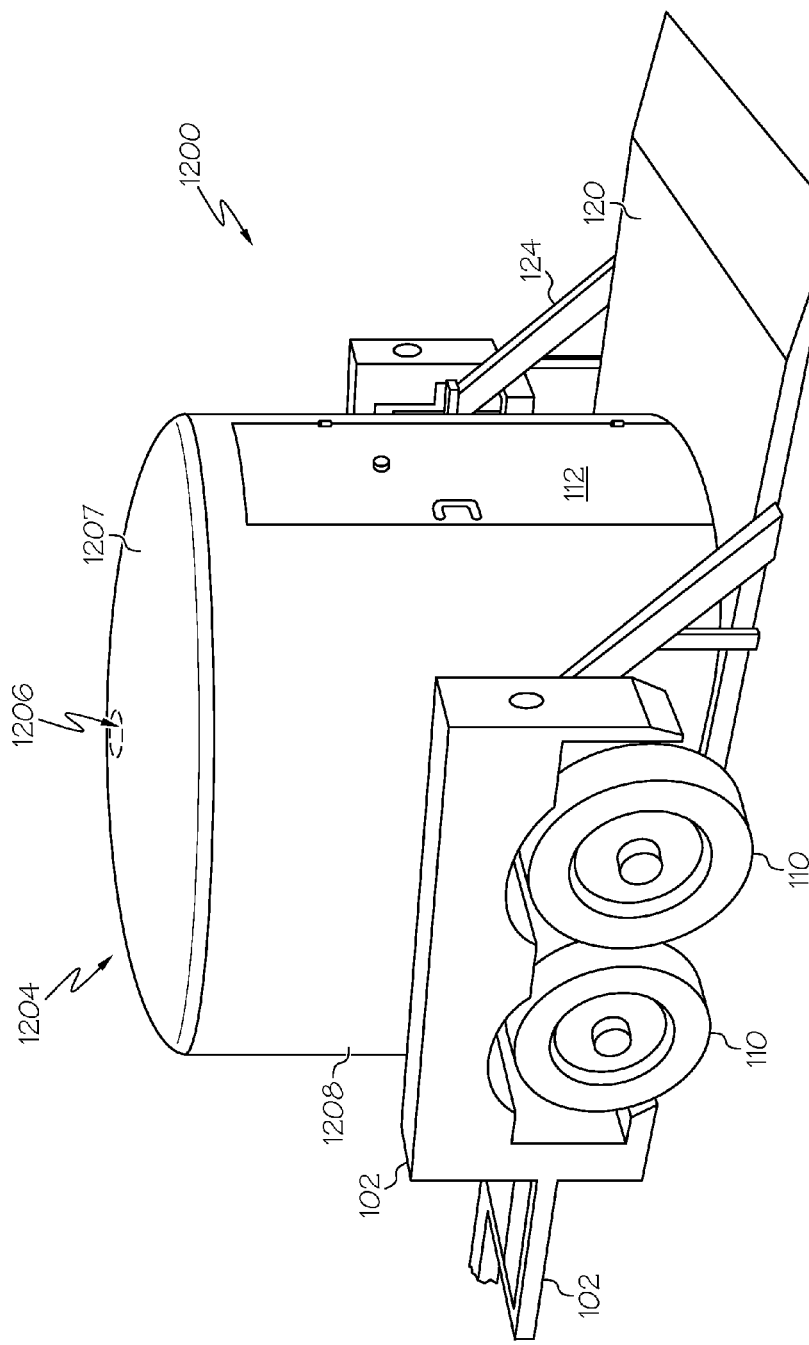
FIG. 12 is a perspective view of a mobile safety platform in its deployed configuration in accordance with a second embodiment.

With reference to FIG. 12, there is illustrated a perspective view of a mobile safety platform 1200 with two or more axles in its deployed configuration in accordance with a second embodiment. As indicated by like reference numerals, in this embodiment mobile safety platform 1200 includes a frame 102 as illustrated and described with reference to FIGS. 1-5. However, in the second embodiment of FIG. 12, protective enclosure 1204 of mobile safety platform 1200 has a curved outer wall 1208 (e.g., defining a cylinder, ellipse or other curved shape in plan) and a convex roof 1207. The curve of outer wall 1208, while reducing the interior floor area and thus rated human capacity of protective enclosure 1204, disproportionately reduces the sliding and overturning forces exerted on protective enclosure 1204 for a given shelter dimension and wind speed. This enables mobile safety platform 1200 to safely be constructed with a lighter overall weight, if desired, than a mobile safety platform having a shelter of comparable maximum dimensions and flat walls. Protective enclosure 1204 of mobile safety platform 1200 can be made with or without an opening 1206 (corresponding to opening 106 of FIG. 1) and at least one "duct" to channel low pressure beneath mobile safety platform in accordance with the teachings of U.S. Pat. No. 8,534,001. Further, in other embodiments, roof 1207 may have other profiles, such as concave or flat.

Figure 13:
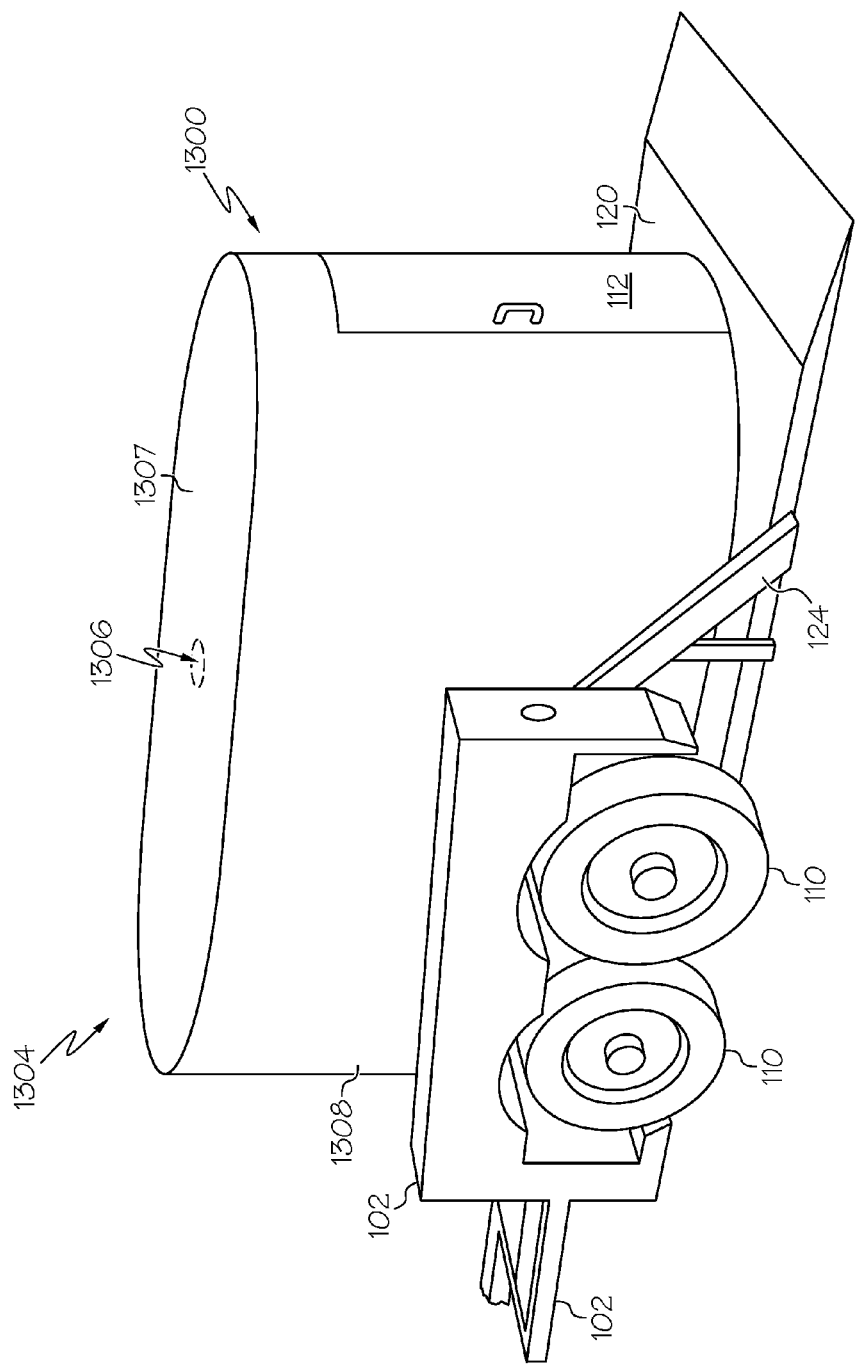
FIG. 13 is a perspective view of a mobile safety platform in its deployed configuration in accordance with a third embodiment.

FIG. 13 is a perspective view of a mobile safety platform in its deployed configuration in accordance with a third embodiment. In this third embodiment, mobile safety platform 1300 includes a protective enclosure 1304 having a sidewall 1308 defining an elongated curved form, such as an elliptical or substantially elliptical form. In addition, protective enclosure 1304 has a flat roof 1307 in which an optional opening 1306 (corresponding to opening 106 of FIG. 1 and opening 1206 of FIG. 12) can be formed. In some implementations, door 112 can be curved to match the curve of sidewall 1308. In other implementations, door 112 is flat.

Figure 14:
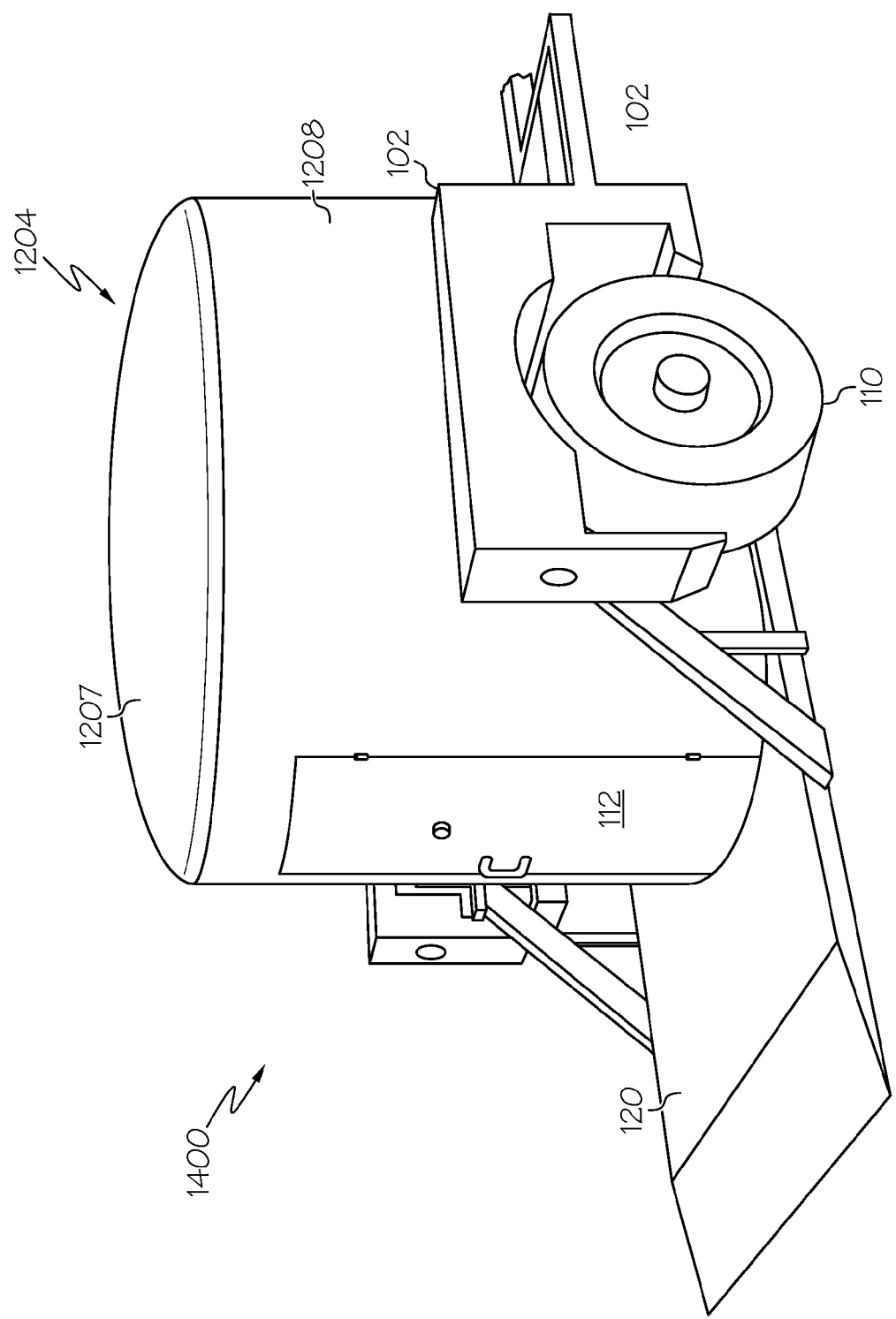
FIG. 14 is a perspective view of a mobile safety platform in its deployed configuration in accordance with a fourth embodiment.

FIG. 14 is a perspective view of a mobile safety platform in its deployed configuration in accordance with a fourth embodiment. In this fourth embodiment, mobile safety platform 1400 includes a protective enclosure 1204 as shown in FIG. 12. However, in this case, frame 102 is equipped with only a single axle and single wheel 110 on each side, rather than two wheels/axels per side as shown in FIGS. 1-5 and 9.

As has been described, in some embodiments, a mobile safety platform includes a protective enclosure coupled to a frame of a wheeled transport. The wheeled transport is configured to raise the protective enclosure so that the wheeled transport can relocate the protective enclosure and to lower the protective enclosure so that the protective enclosure and/or frame is deployed on a substrate. In at least one embodiment, the wheeled transport is configured to raise and to lower the protective enclosure utilizing a lifting and lowering mechanism, such as a hydraulic system. In at least one embodiment, the lifting and lowering mechanism is configured, when deployed, to transfer at least some of the weight of the transport to the protective enclosure and/or deck. In at least one embodiment, the wheeled transport comprises a trailer. In other embodiments, the wheeled transport can be a motor vehicle including an engine.

As employed herein, "coupled" can mean direct connection between two elements and/or indirect connection via one or more intermediate elements. Further, all uses of the term "embodiment" do not necessarily refer to the same embodiment.

While the present invention has been particularly shown as described with reference to one or more preferred embodiments, it will be understood by those skilled in the art that various changes in form and detail may be made therein without departing from the spirit and scope of the invention.

What is claimed is:

1. A mobile safety platform, comprising:
a frame;
two or more wheels coupled to the frame and configurable to rollably support the frame on a substrate;
a movable deck coupled to the frame;
a protective enclosure coupled to the frame, wherein the protective enclosure includes a roof and at least one sidewall and has an interior volume sized to accommodate at least one person; and
a lifting and lowering mechanism coupled to the movable deck and configured to allow the movable deck to move between a first position in which the movable deck is spaced above the substrate and a second position in which the movable deck contacts the substrate, wherein the lifting and lowering mechanism is configured to raise the two or more wheels at least partially with respect to the deck when the movable deck is in the second position, such that at least some weight of the frame and the two or more wheels is borne by at least one of the protective enclosure and movable deck.

2. A mobile safety platform, comprising:
a frame;
two or more wheels coupled to the frame and configurable to rollably support the frame on a substrate;
a movable deck coupled to the frame;
a protective enclosure coupled to the frame, wherein the protective enclosure includes a roof and at least one sidewall and has an interior volume sized to accommodate at least one person;
a lifting and lowering mechanism coupled to the movable deck and configured to allow the movable deck to move between a first position in which the movable deck is spaced above the substrate and a second position in which the movable deck is closer to the substrate; and
one or more grousers coupled to the movable deck and configured to contact the substrate when the movable deck is in the second position.

3. The mobile safety platform of claim 1, wherein the lifting and lowering mechanism comprises a hydraulic system including at least one hydraulic cylinder.

4. The mobile safety platform of claim 3, wherein the at least one hydraulic cylinder is a double acting hydraulic cylinder.

5. A mobile safety platform, comprising:
a frame;
two or more wheels coupled to the frame and configurable to rollably support the frame on a substrate;
a movable deck coupled to the frame;
a protective enclosure coupled to the frame, wherein the protective enclosure includes a roof and at least one sidewall and has an interior volume sized to accommodate at least one person, wherein the protective enclosure has an aperture located proximate a point of low static air pressure during a high-velocity wind event and an air duct providing airflow communication between a substantially enclosed subfloor region and an exterior region of the protective enclosure via the aperture; and
a lifting and lowering mechanism coupled to the movable deck and configured to allow the movable deck to move between a first position in which the movable deck is spaced above the substrate and a second position in which the movable deck contacts the substrate.

6. A mobile safety platform, comprising:
a frame;
two or more wheels coupled to the frame and configurable to rollably support the frame on a substrate;
a movable deck coupled to the frame;
a protective enclosure coupled to the frame, wherein the protective enclosure includes at least one sidewall and a curved roof and has an interior volume size to accommodate at least one person; and
a lifting and lowering mechanism coupled to the movable deck and configured to allow the movable deck to move between a first position in which the movable deck is spaced above the substrate and a second position in which the movable deck contacts the substrate.

7. The mobile safety platform of claim 6, wherein the curved roof comprises a barrel vault.

8. A mobile safety platform, comprising:
a frame;
two or more wheels coupled to the frame and configurable to rollably support the frame on a substrate;
a movable deck coupled to the frame;
a protective enclosure coupled to the frame, wherein the protective enclosure includes at least one sidewall and a flat roof and has an interior volume size to accommodate at least one person; and
a lifting and lowering mechanism coupled to the movable deck and configured to allow the movable deck to move between a first position in which the movable deck is spaced above the substrate and a second position in which the movable deck contacts the substrate.

9. A method of deploying a mobile safety platform, the method comprising:
transporting to a site a mobile safety platform including:
a frame;
two or more wheels coupled to the frame and configurable to rollably support the frame on a substrate;
a movable deck coupled to the frame;
a protective enclosure coupled to the frame; and
a lifting and lowering mechanism coupled to the movable deck; and
actuating the lifting and lowering mechanism such that the movable deck is lowered from a first position in which the movable deck is spaced above the substrate to a second position in which the movable deck contacts the substrate and the two or more wheels are at least partially raised with respect to the deck and such that at least some weight of the frame and the two or more wheels is borne by at least one of the protective enclosure and movable deck.

10. A mobile safety platform, comprising:
a frame;
two or more wheels coupled to the frame and configurable to rollably support the frame on a substrate;
a movable deck coupled to the frame;
a protective enclosure coupled to the movable deck, wherein the protective enclosure includes a roof, at least one sidewall, a floor, an aperture located proximate a point of low static air pressure during a high-velocity wind event, and an air duct providing airflow communication between a substantially enclosed subfloor region and an exterior region of the protective enclosure via the aperture; and
a lifting and lowering mechanism coupled to the movable deck and configured to allow the movable deck to move between a first position in which the movable deck is spaced above the substrate and a second position in which the movable deck contacts the substrate.

11. The mobile safety platform of claim 10, wherein the lifting and lowering mechanism is configured to raise the two or more wheels at least partially with respect to the frame when the movable deck is in the second position, such that at least some weight of the frame and two or more wheels is borne by at least one of the protective enclosure and movable deck.

12. The mobile safety platform of claim 10, and further including one or more grousers coupled to the movable deck.

13. The mobile safety platform of claim 10, wherein the lifting and lowering mechanism comprises a hydraulic system including at least one hydraulic cylinder.

14. The mobile safety platform of claim 13, wherein the at least one hydraulic cylinder is a double acting hydraulic cylinder.

15. The mobile safety platform of claim 10, wherein the protective enclosure includes at least one sidewall and a curved roof.

16. The mobile safety platform of claim 15, wherein the curved roof comprises a barrel vault.

17. The mobile safety platform of claim 10, wherein the protective enclosure includes at least one sidewall and a flat roof.

18. A method of deploying a mobile safety platform, the method comprising:
transporting to a site a mobile safety platform including:
a frame;
two or more wheels coupled to the frame and configurable to rollably support the frame on a substrate;
a movable deck coupled to the frame;
a protective enclosure coupled to the movable deck, wherein the protective enclosure includes a floor and an aperture located proximate a point of low static air pressure during a high-velocity wind event and an air duct providing airflow communication between a substantially enclosed subfloor region and an exterior region of the protective enclosure via the aperture;
a lifting and lowering mechanism coupled to the movable deck; and
actuating the lifting and lowering mechanism such that the movable deck is lowered from a first position in which the movable deck is spaced above the substrate to a second position in which the movable deck contacts the substrate and the substantially enclosed subfloor region is formed between the movable deck and the substrate.

19. The method of claim 18, wherein the actuating includes actuating the lifting and lowering mechanism such that the two or more wheels are at least partially raised with respect to the movable deck and such that at least some weight of the frame and the two or more wheels is borne by at least one of the protective enclosure and movable deck.

* * * * *